United States Patent
Sundaram et al.

(10) Patent No.: US 9,590,961 B2
(45) Date of Patent: Mar. 7, 2017

(54) AUTOMATED SECURITY PROVISIONING PROTOCOL FOR WIDE AREA NETWORK COMMUNICATION DEVICES IN OPEN DEVICE ENVIRONMENT

(75) Inventors: Ganapathy S. Sundaram, Hillsborough, NJ (US); Harish Viswanathan, Morristown, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 2366 days.

(21) Appl. No.: 12/503,051

(22) Filed: Jul. 14, 2009

(65) Prior Publication Data

US 2011/0016321 A1    Jan. 20, 2011

(51) Int. Cl.
    *H04L 29/06*    (2006.01)
    *H04W 4/00*    (2009.01)
    (Continued)

(52) U.S. Cl.
    CPC ........ *H04L 63/061* (2013.01); *H04L 63/0869* (2013.01); *H04L 67/12* (2013.01);
    (Continued)

(58) Field of Classification Search
    USPC .............................. 713/171; 705/63; 380/270
    See application file for complete search history.

(56) References Cited

U.S. PATENT DOCUMENTS 8,041,035 B2 * 10/2011 Miller ........................... 380/255
2011/0265158 A1 * 10/2011 Cha et al. ......................... 726/6

FOREIGN PATENT DOCUMENTS

WO    PCT/US2010/040224    2/2011

OTHER PUBLICATIONS

Cao et al. "Identity-Based Authenticated Key Agreement Protocols without Bilinear Pairings", IEICE Trans. Fundamentals, vol. E91-A, No. 12. Dec. 2008.*
D. Boneh et al., "Identity-Based Encryption from the Weil Pairing," CRYPTO 2001, LNCS 2139, 2001, pp. 213-229.
(Continued)

*Primary Examiner* — Benjamin Lanier
(74) *Attorney, Agent, or Firm* — Ryan, Mason & Lewis, LLP

(57) ABSTRACT

An automated security provisioning protocol is provided for wide area network communication devices in an open device environment, such as cellular communication devices in a machine-to-machine (M2M) environment. For example, a method for performing a security provisioning protocol between a first communication device and a second communication device over at least one wide area communication network comprises the following steps from the perspective of the first communication device. The first communication device automatically uses access information not previously provisioned in the wide area communication network to gain access to the wide area communication network for an initial purpose of communicating with the second communication device. The first communication device, upon gaining access to the wide area communication network, automatically performs an authenticated key exchange operation with the second communication device over the wide area communication network and establishes a secure communication key as a result of the authenticated key exchange operation for subsequent use by the first communication device for secure communications. The wide area communication network is operated by a first entity and the second communication device is operated by a second entity.

37 Claims, 10 Drawing Sheets

(51) Int. Cl.
    *H04W 12/04*     (2009.01)
    *H04W 12/06*     (2009.01)
    *H04L 29/08*     (2006.01)
    *H04W 8/20*     (2009.01)
    *H04W 74/00*     (2009.01)
    *H04W 84/04*     (2009.01)
    *H04W 92/18*     (2009.01)

(52) U.S. Cl.
    CPC ............... *H04L 67/34* (2013.01); *H04W 4/00* (2013.01); *H04W 4/005* (2013.01); *H04W 12/04* (2013.01); *H04W 12/06* (2013.01); H04L 63/0442 (2013.01); *H04W 8/205* (2013.01); *H04W 74/00* (2013.01); *H04W 84/04* (2013.01); *H04W 92/18* (2013.01)

(56) References Cited

OTHER PUBLICATIONS

V. Boyko et al., "Provably Secure Password-Authenticated Key Exchange Using Diffie-Hellman," EuroCrypt 2000, pp. 156-171.

U.S. Appl. No. 12/372,242, filed Feb. 17, 2009 in the name of Ganapathy S. Sundaram and entitled "Identity Based Authenticated Key Agreement Protocol."

"3rd Generation Partnership Project; Technical Specification Group Services and System Aspects; Feasibility Study on the Security Aspects of Remote Provisioning and Change of Subscription for M2M Equipment; (Release 9)," 3GPP TR 33.812, V1.4.0, Technical Report, Jun. 2009, 69 pages.

"Restructuring and Clarification of Annex," 3GPP TSG SA WG3 Security—S3#56, Jul. 2009, 7 pages.

\* cited by examiner

FIG. 1

| | ROLE | CONSUMER | DEVICE | NETWORK PROVIDER | M2M OPERATOR | APPLICATION PROVIDER |
|---|---|---|---|---|---|---|
| CONSUMER | SUBSCRIBES TO UTILITY | | | | | |
| DEVICE | SMART METER WITH WIRELESS MODULE | DEVICE INSTALLED IN CONSUMER'S PREMISES | | | | |
| NETWORK PROVIDER | PROVIDES CELLULAR COMMUNICATION | NONE | CERTIFIES THE WIRELESS MODULE IN THE DEVICES | | | |
| M2M OPERATOR | VIRTUAL NETWORK OPERATOR THAT SERVES AS THE HOME NETWORK FOR DEVICES AND PROVIDES CONNECTIVITY OVER MULTIPLE TRANSPORT NETWORK PROVIDERS | NONE | NONE | ROAMING RELATIONSHIP | | |
| APPLICATION PROVIDER | UTILITY COMPANY THAT PROVIDES THE SMART METERING APPLICATION AND SERVICES | CONSUMER SUBSCRIBES TO THE UTILITY SERVICE | DEVICE OWNED AND DEPLOYED BY UTILITY | NONE | AP SUBSCRIBES FOR CONNECTIVITY SERVICES WITH THE M2M OPERATOR | |
| DEVICE MANUFACTURER | MAKES THE METER AND INTEGRATES WIRELESS MODULE | NONE | MAKES THE DEVICE | NONE | NONE | MANUFACTURER PROVIDES THE DEVICES TO THE UTILITY FOR DEPLOYMENT |

FIG. 2

| | ROLE | CONSUMER | DEVICE | NETWORK PROVIDER | M2M OPERATOR | APPLICATION PROVIDER |
|---|---|---|---|---|---|---|
| CONSUMER | SUBSCRIBES TO VOICE SERVICE | | | | | |
| DEVICE | CELL PHONE | DEVICE OWNED BY CONSUMER | | | | |
| NETWORK PROVIDER | PROVIDES CELLULAR COMMUNICATION | PROVIDES THE DEVICE | CERTIFIES THE DEVICES | | | |
| M2M OPERATOR | DOES NOT EXIST | NONE | NONE | NONE | | |
| APPLICATION PROVIDER | SAME AS NETWORK PROVIDER | NONE | NONE | NONE | NONE | |
| DEVICE MANUFACTURER | MAKES THE DEVICE | NONE | MAKES THE DEVICE | WHOLESALE SUPPLIER | NONE | NONE |

FIG. 3

| | ROLE | CONSUMER | DEVICE | NETWORK PROVIDER | M2M OPERATOR | APPLICATION PROVIDER |
|---|---|---|---|---|---|---|
| CONSUMER | SUBSCRIBES TO TRACKING SERVICE FROM AP | | | | | |
| DEVICE | TRACKING DEVICE | CONSUMER BUYS OFF-THE-SHELF DEVICE FROM RETAILER | | | | |
| NETWORK PROVIDER | PROVIDES CELLULAR COMMUNICATION | NONE | CERTIFIES THE WIRELESS MODULE IN THE DEVICES | | | |
| M2M OPERATOR | VIRTUAL NETWORK OPERATOR THAT SERVES AS THE HOME NETWORK FOR DEVICES AND PROVIDES CONNECTIVITY OVER MULTIPLE TRANSPORT NETWORK PROVIDERS | NONE | NONE | ROAMING RELATIONSHIP | | |
| APPLICATION PROVIDER | PROVIDES FLEET MANAGEMENT SERVICES TO SMALL AND MEDIUM ENTERPRISES | CONSUMER SUBSCRIBES TO THE TRACKING SERVICE | NONE | NONE | AP SUBSCRIBES FOR CONNECTIVITY SERVICES WITH THE M2M OPERATOR | |
| DEVICE MANUFACTURER | MAKES THE DEVICE | NONE | MAKES THE DEVICE AND SELLS THROUGH RETAIL OUTLETS | NONE | NONE | NONE |

| TYPE | RADIO NETWORK | | CORE NETWORK | |
|---|---|---|---|---|
| cdma1x | BTS | BSC | PDSN | HA |
| HRPD | BTS | RNC | PDSN | HA |
| UMB | ENHANCED BS | | AGW | HA |
| GPRS | BTS | RNC | SGSN | GGSN |
| UMTS/HSPA | NODE B | RNC | SGSN | GGSN |
| LTE-SAE | ENHANCE NODE B | | SAE-GW | P-GW |
| WiMAX | BASE STATION | | ASN-GW | CSN-GW |

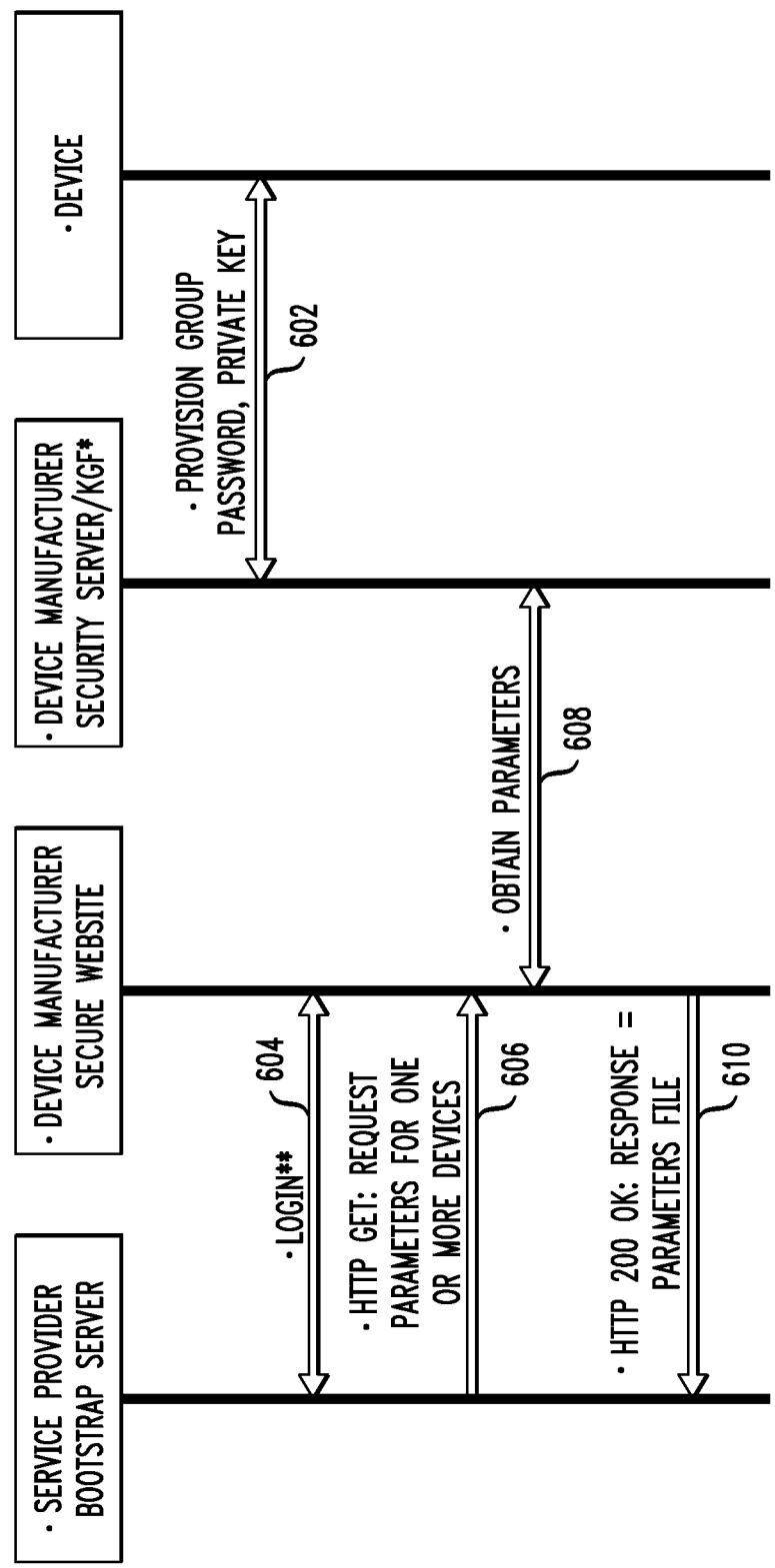

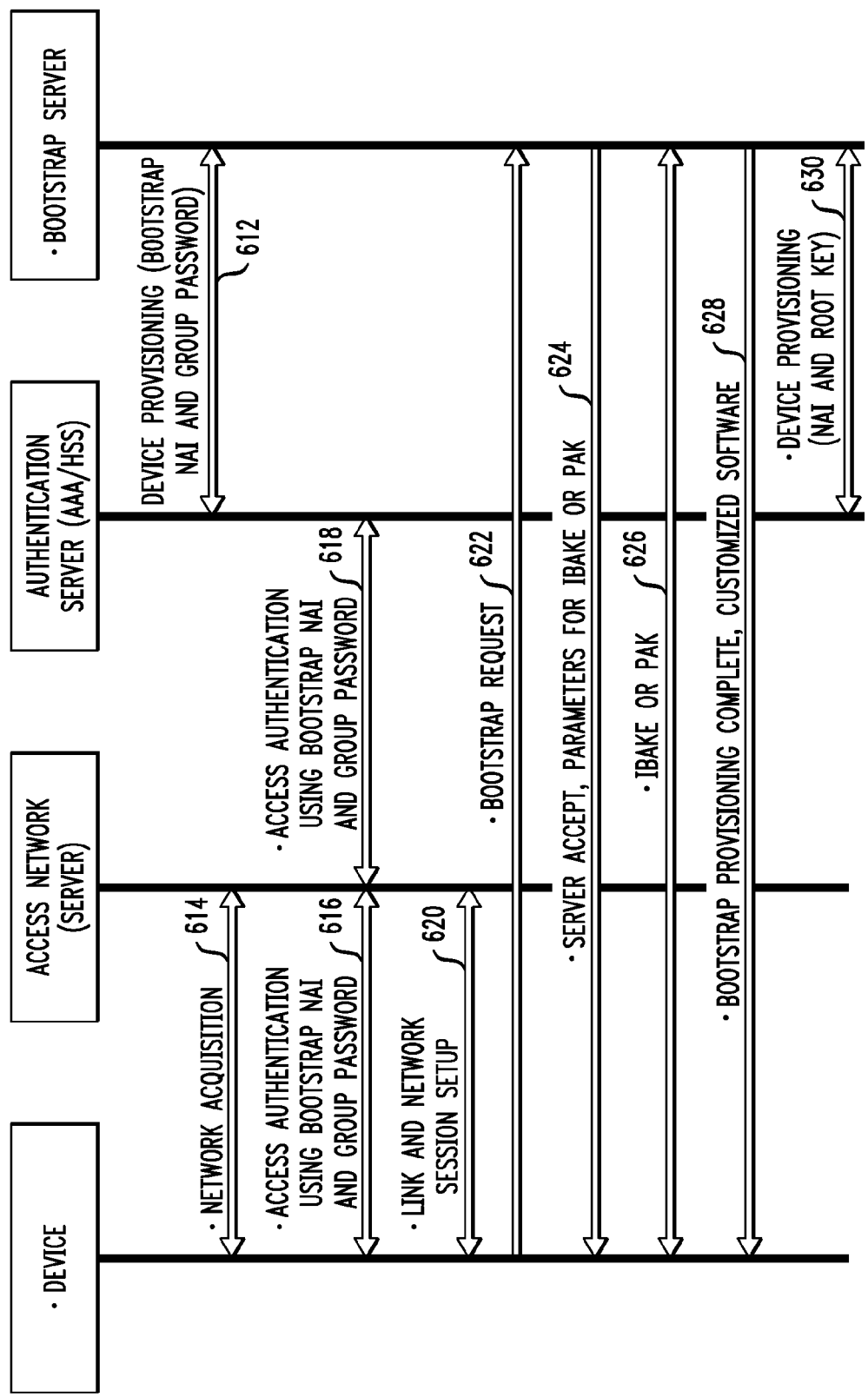

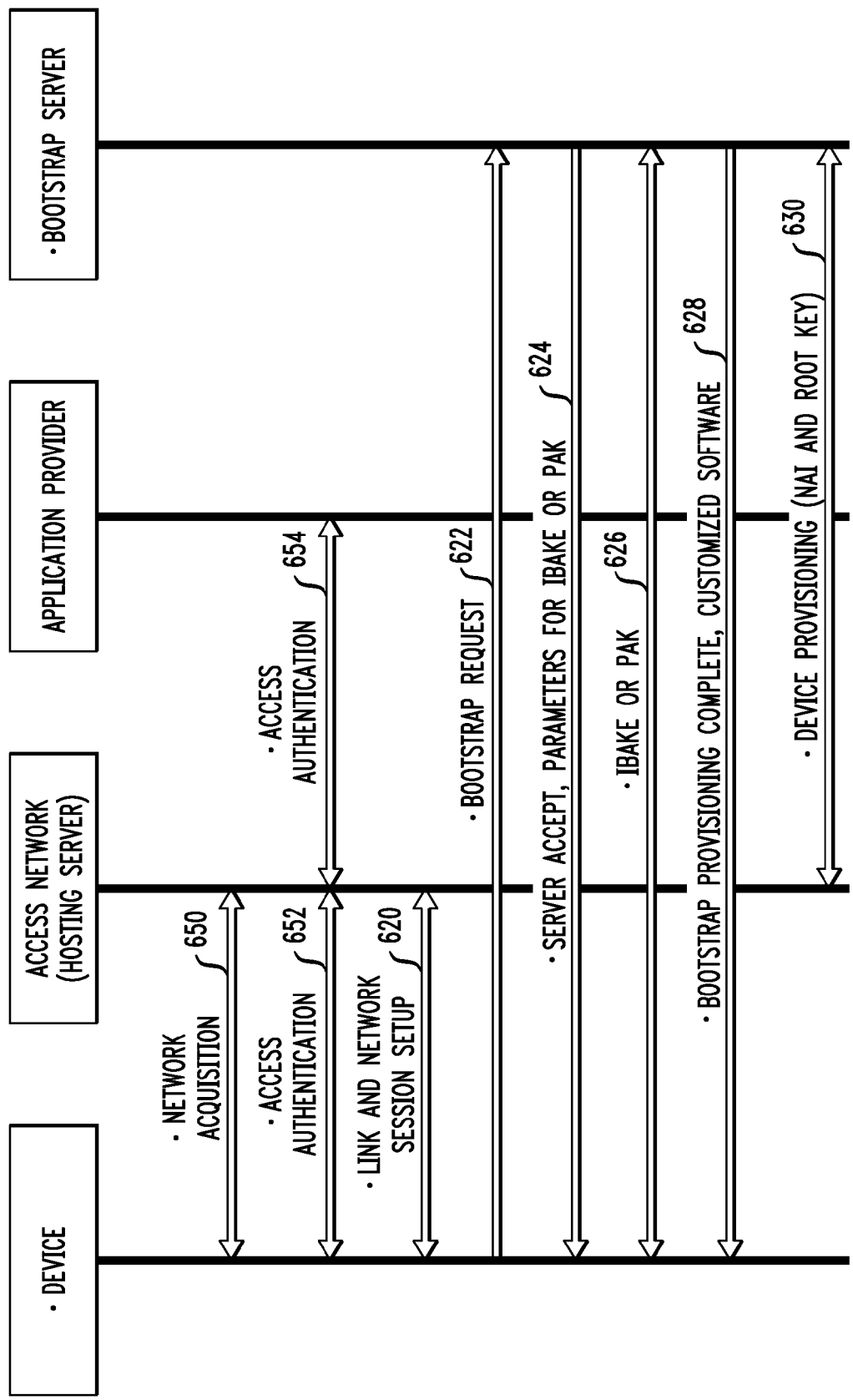

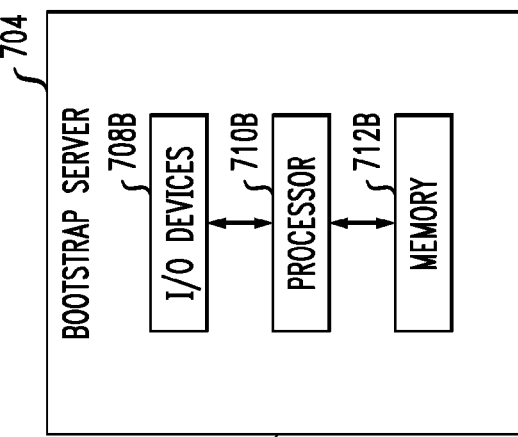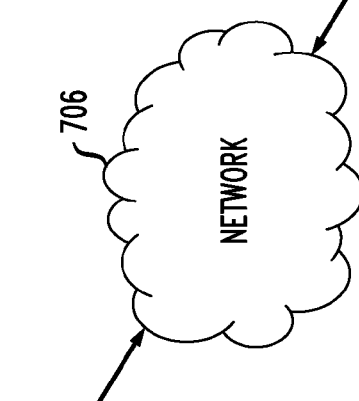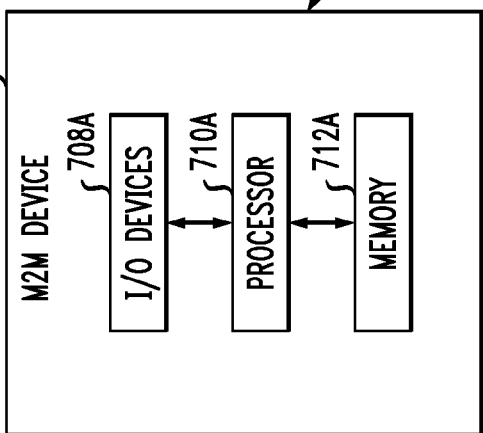
FIG. 7
700

AUTOMATED SECURITY PROVISIONING PROTOCOL FOR WIDE AREA NETWORK COMMUNICATION DEVICES IN OPEN DEVICE ENVIRONMENT

FIELD OF THE INVENTION

The present invention relates generally to communication security and, more particularly, to an automated security provisioning protocol for wide area network communication devices in an open device environment, such as cellular communication devices in a machine-to-machine (M2M) environment.

BACKGROUND OF THE INVENTION

Machine-to-machine (M2M) communications can be generally defined as communications from or to a device that is not directly employed by humans. A variety of devices can be said to originate or terminate M2M communications. M2M communications has been deployed for several decades in many different scenarios.

Wide-area M2M refers to M2M applications where the devices span a large area and the communication solution relies on a wide area communication network such as a mobile cellular network. Like most wireless communication environments, communication security in an M2M environment using cellular communication devices is considered an important factor for wide scale adoption of M2M services. However, adequate solutions for security provisioning protocol for wide area network communication devices in an M2M environment are not currently available.

Thus, a need exists for security provisioning protocols for communication devices in an M2M environment and, more generally, in any open device environment.

SUMMARY OF THE INVENTION

Embodiments of the invention provide an automated security provisioning protocol for wide area network communication devices in an open device environment, such as cellular communication devices in a machine-to-machine (M2M) environment.

For example, in one aspect, a method for performing a security provisioning protocol between a first communication device and a second communication device over at least one wide area communication network comprises the following steps from the perspective of the first communication device. The first communication device automatically uses access information not previously provisioned in the wide area communication network to gain access to the wide area communication network for an initial purpose of communicating with the second communication device. The first communication device, upon gaining access to the wide area communication network, automatically performs an authenticated key exchange operation with the second communication device over the wide area communication network and establishes a secure communication key as a result of the authenticated key exchange operation for subsequent use by the first communication device for secure communications. The wide area communication network is operated by a first entity and the second communication device is operated by a second entity.

In one embodiment, the first entity may be a cellular network operator, and the second entity may be a mobile virtual network operator. The mobile virtual network operator may take the form of an M2M operator. In another embodiment, an application provider can take the place of the M2M operator such that the first communication device communicates directly with the application provider via the wide area communication network.

In another aspect, a method for performing a security provisioning protocol between a first communication device and a second communication device over at least one wide area communication network comprises the following steps from the perspective of the second communication device. The second communication device obtains identification information associated with the first communication device. The second communication device, upon the first communication device gaining access to the wide area communication network using access information stored on the first communication device and not previously provisioned in the wide area communication network, automatically performs an authenticated key exchange operation with the first communication device over the wide area communication network and establishes a secure communication key as a result of the authenticated key exchange operation for subsequent use by the first communication device for secure communications. As above, the wide area communication network is operated by a first entity and the second communication device is operated by a second entity.

Advantageously, in this manner, the first communication device is able to perform a security bootstrapping operation (i.e., generation of the secure communication key via the authenticated key exchange) with the second communication device without any pre-provisioning from the perspective of the wide area communication network. That is, the first communication device is not previously identified to the wide area communication network but is still able to access the wide area communication network (without modification to the network) in order to perform the authenticated key exchange operation with the second communication device. This may be accomplished by use of a shared secret (e.g., a group password) that the first and second communication device both have. Further, in another illustrative embodiment, the first communication device can cycle through networks of which it is aware until it gains access to one access network through which it can communicate with the second communication device.

It is to be appreciated that while principles of the invention are particularly suitable to an M2M environment, where the first communication device is an M2M client device, the invention is not intended to be so limited. That is, principles of the invention are generally applicable to any open device environment in which it is desirable to provide security provisioning features.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a table illustrating business relationships between the main entities in a smart metering service.

FIG. 2 is a table illustrating business relationships between the main entities in a voice service.

FIG. 3 is a table illustrating business relationships between the main entities in a fleet management service.

FIG. 5 is a table illustrating architectures for alternative access networks suitable for implementing one or more of the protocols according to embodiments of the present invention.

FIG. 6A is a flow diagram illustrating an offline stage of a security provisioning protocol in accordance with an embodiment of the present invention;

FIG. 6B is a flow diagram illustrating an online stage of a security provisioning protocol in accordance with an embodiment of the present invention;

FIG. 6E is a flow diagram illustrating an online stage of a security provisioning protocol in accordance with another embodiment of the present invention; and FIG. 7 is a block diagram illustrating a generalized hardware architecture of a data network and communication devices suitable for implementing one or more of the protocols according to embodiments of the present invention.

DETAILED DESCRIPTION OF PREFERRED EMBODIMENTS

Figure 4:
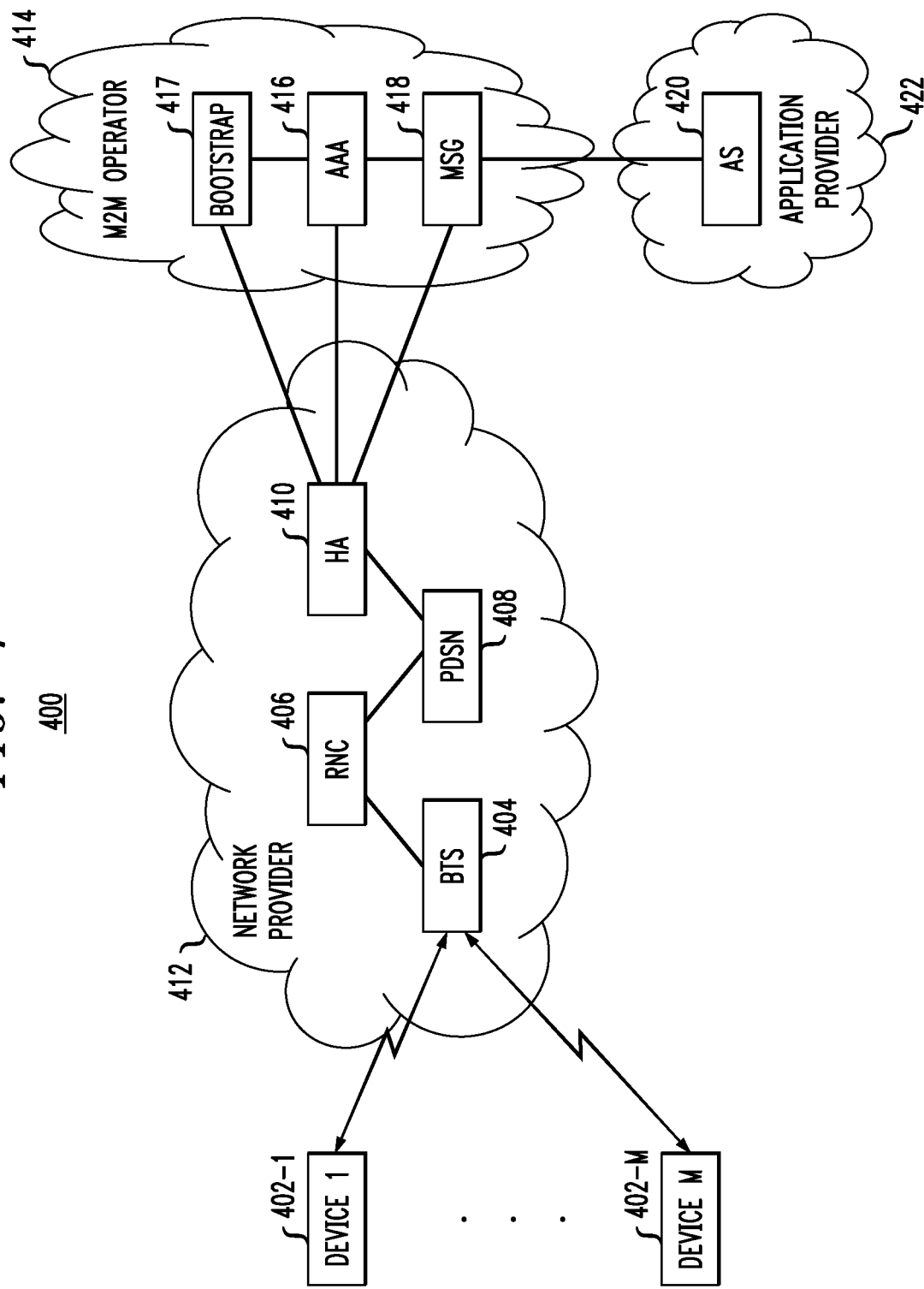
FIG. 4 is a block diagram illustrating a machine-to-machine service architecture for a cellular access network implementing one or more of the protocols according to embodiments of the present invention.

The following description will illustrate the invention in the context of an exemplary machine-to-machine (M2M) environment. It should be understood, however, that while principles of the invention are particularly suitable to such an M2M environment, the invention is not limited to use with the same. That is, principles of the invention are generally applicable to any open device environment in which it is desirable to provide security provisioning features.

The phrase "open device" may be generally defined as a communication device operating in a network on which one can run applications (e.g., firmware or software) from any provider other than the network operator without prior approval by the network operator. Examples of these types of devices include but are not limited to sensors, location tags, machines, monitors, and meters. The types of applications that such devices can enable are conceivably limitless. By way of only a few examples, such application-specific devices may include health monitors, utility management meters, fleet management tags, vending machines, and point-of-sale terminals. Basically, with an open device environment, it is desirable that one should be able to obtain a device and connect to a network without any pre-provisioning by the network operator.

Thus, the notion of an "open device," such as an M2M device, securely operating over a publicly-accessible wide area communication network such as a cellular network operated by a cellular network operator (by way of example only, Verizon, AT&T or Sprint), is what illustrative principles of the invention are intended to address.

For ease of reference, the detailed description is divided as follows. Section I describes characteristics of a cellular M2M environment. Section II states a security bootstrapping problem addressed by illustrative principles of the invention. Section III describes an exemplary cellular M2M environment in comparison with an exemplary cellular voice environment. Section IV describes an exemplary cellular M2M architecture for implementing one or more of the security provisioning protocols according to illustrative principles of the invention. Section V describes security and bootstrapping features for M2M services according to illustrative embodiments of the invention. Section VI describes a security provisioning protocol according to one embodiment of the invention. Section VII describes a security provisioning protocol according to an alternative embodiment of the invention. Section VIII describes an application provider-based bootstrap embodiment of the invention. Section IX describes an illustrative computing system for implementing one or more security provisioning protocols according to the invention.

I. Characteristics of Cellular M2M Environment

Cellular M2M may be considered as differing from current cellular networks in two main ways that leads to a realization that the current mechanisms in place for provisioning wireless handsets and personal digital assistants in cellular networks are not sufficient for an M2M environment.

First, cellular network services today are typically provided by a single service provider that typically owns the device distribution (or at least the Subscriber Identity Module or SIM card distribution), SIM provisioning, the network infrastructure, and service delivery for voice services. In some cases, the device distribution, device provisioning, and service delivery are owned by a mobile virtual network operator (MVNO) while the network infrastructure alone is owned by the network provider.

For a cellular M2M environment, assume a scenario in which there are multiple entities with limited business relationships among them, best explained by the following example. Assume a utility company wants to deploy smart meters in the homes for which they provide electricity wherein the smart meters employ cellular wireless modems for connectivity. In one approach to implementing this solution, assume that the utility company orders meters from a meter manufacturer, and subscribes to the M2M service of an M2M MVNO operator who has negotiated bandwidth with multiple cellular operators. The utility company deploys the meters from the manufacturer in the homes while provisioning them in their database and in the database of the MVNO providing the connectivity service. The entities involved in providing this solution are thus the utility company, which is the application provider in this case, an M2M operator that they enlist for this purpose, cellular access network provider, the meter (including the communication device) manufacturer, and the end-user. It is realized that there is little or no relationship between the utility company that deploys the devices and the cellular access network provider. However, there is a need for a security solution that should be workable in such an environment and in like environments.

Second, it is realized that, in cellular network environments, some applications may involve a very large number of devices, each contributing only a small amount of data, and hence revenue, to the various entities involved. The economics of such applications does not allow a manual security provisioning process to be adopted. A simpler process that is more conducive for automated provisioning, and a capability to efficiently deal with a large number of device manufacturers, is therefore desirable. For example, in the smart metering example above, a deployment process to strive for would be to simply ship the meter directly from the manufacturer to the end-user at the direction of the utility company and have the end-user self install the meter and turn it on to make it functional. In general, M2M devices are typically not customizable prior to delivery to the site. They are identical shrink-wrapped "clones" that differ only by their unique medium access control (MAC) address and electronic serial numbers (ESN). The devices may be installed over multiple timeframes and should seamlessly integrate into the network. Furthermore, the installation may be done by workers with minimal communication engineering experience.

Thus, in the cellular M2M context, it is realized that there is the potential for billions of devices and hundreds of applications provided by a few operators or virtual operators leveraging a mix of access networks. Therefore, what can be expected is a multitude of device vendors participating in a relatively open environment selling low-cost devices directly to consumers. For instance, the device manufacturer and the service provider may not have a business relationship where the subscribers buy the devices in an open market. Alternatively, in residential applications such as metering, the end-user (home-owner) may not even know the virtual network operator who is providing the service on behalf of the owner of the organization which owns the application, but yet securing the application is critical to all entities in the chain.

II. Problem Statement

A main problem addressed by principles of the invention is referred to as the "bootstrapping problem," i.e., how does an end-user device (machine) obtain a root key to support various security functions. A root key is generally understood to be a key from which one or more other keys can be derived.

It is realized that almost every system that supports security has to address a bootstrapping problem—this is equally applicable to symmetric key solutions (bootstrapping a root key) as well as public key solutions (bootstrapping certificates and private keys). In fact, most standards do not address this problem and leave it to 'off-line' mechanisms to achieve this goal. Well-known bootstrapping mechanisms include:

(i) Individually pre-provisioning root keys during manufacture following which the manufacturer provides a database of keys and corresponding device serial numbers to the service provider. This is applicable when the device manufacturer uses the service provider as the de-facto distribution channel.

(ii) The service provider provisions a key when the device/service is purchased by the end-user. This is applicable when the subscriber and the service provider are directly involved in the service provisioning.

(iii) The end-user chooses a root key and provisions it into the network device as well as the client. This is particularly attractive when the network device is a home router, and the services provided by the network device are not connected to the operator.

Because of the unique characteristics of the cellular M2M outlined above, these well-known bootstrapping mechanisms ((i) through (iii)) are not suitable for cellular M2M.

Accordingly, illustrative principles of the invention propose an over-the-air root key provisioning protocol based on an identity-based authenticated key exchange or a password-based authenticated key exchange that balances goals of achieving security and keeping device provisioning efficient. Described step-by-step below is an M2M device deployment process and how end-to-end security is achieved. The solution allows application providers to deploy the M2M device with only the knowledge of the identity of the device (such as electronic serial number). The solution can be implemented by the M2M operator without impacting the current cellular network operator infrastructure.

Unlike cellular phones, personal digital assistants (PDAs) or wireless enabled laptops, M2M devices are often unattended and are subject to a higher risk of vandalism and misuse. In particular, the threat of using a cellular M2M device for other applications such as web browsing is more realizable and such tampering may involve users who do not have any relationship to the device. The security solution should be designed to protect against such an inappropriate use of the device to protect the network operator and the M2M application provider. We therefore identify such threats and provide various features of an end-to-end solution that secure against such attacks.

III. Cellular M2M Environment

Traditional cellular voice and data services are provided by service providers that deploy and operate the network, market the services to the end users, certify and channel the devices to end-users, and manage the end-user subscriptions and billing. Essentially, a single entity is involved in all aspects of the service. M2M services, on the other hand, typically involve multiple entities in the delivery of the service. The entities involved most commonly are the end-user, the network provider, the M2M operator, the application provider and the machine/device manufacturer. M2M operators negotiate for bandwidth in bulk from multiple network providers and manage the cellular network access subscriptions on behalf of many application providers. Application providers, as the name indicates, are the entities that provide the end-user application such as collecting and processing the data. End-users may buy the machines that incorporate the cellular connectivity module directly from the manufacturer (through a retail distribution network) or from the application provider. Thus, the M2M environment is more complex than the traditional cellular voice/data service, which makes guaranteeing end-to-end security more challenging.

The M2M service delivery environment is more complex for multiple reasons, for example:

(i) Given the scope of cellular M2M communications, it is expected that many manufacturers will participate in an open environment. This implies that the application provider may or may not have a relationship with the manufacturer. This is especially true for mass market applications, where individual machines communicate sparingly, and maintaining the device distribution supply chain would result in extra costs to the application provider. Conversely, for high end, low volume, high value applications (like acute health condition monitors), it makes sense for the application provider to own the distribution of the devices to the end-users.

(ii) An important condition for many M2M services is guaranteed cellular coverage across many regions since the customers for a given application may span a wide area even though a given network provider may be regional. This involves the use of multiple access network providers' networks. Furthermore, some of the processes such as provisioning, billing, and device management are substantially different for M2M devices compared to that of the human devices, such as handsets, such that traditional network providers are ill-equipped to economically perform these processes. This has resulted in the need for an M2M operator that bridges the application provider and the network operator. Clearly, the application provider maintains business relationships with the customer and the M2M operator (M2MO). Similarly, the M2MO has relationships with one or more access network operators. While the access network provider may itself be the M2MO, in illustrative embodiments, the focus is on the case where the M2MO acts like a traditional MVNO (mobile virtual network operator) with application providers as customers.

(iii) The device may be used by an end-user customer but he/she may not have ownership of the device. Moreover, the device may or may not have an interface for the customer to interact.

The business relationships involved in M2M service delivery are illustrated using two use cases. The first is that of smart metering. In this example, an electric utility company will buy and distribute smart meters from a meter manufacturing company to the end-users that subscribe to the utility service. The utility company will own and deploy the meters in the premises of the end consumers. The utility company subscribes to an M2M service from an M2M operator for meter data collection and device management. The M2MO in turn has relationships with network providers for use of the bandwidth for transmission of data. FIG. 1 shows a table of the various entities and the relationships between them. For comparison, FIG. 2 shows a table of the relationships involved in the case of the typical cellular voice service. A comparison of the tables shows that many of the entries in the table of FIG. 2 are void (relationship denoted as "none") indicating a simpler environment.

FIG. 3 shows another tabular example of an M2M service, i.e., fleet management. In this service, an application provider is providing fleet tracking and scheduling services to small and medium enterprises. This service differs from the smart metering case primarily in the fact that the devices are bought by the end customers from retail outlets, and are owned and deployed by themselves as opposed to the application provider.

Thus, the M2M environment involves the situation where potentially a billion customers (each customer having one or more devices) communicate, and are served by, for example, thousands of application providers. These application providers work with a handful of M2MOs who in turn work with multiple network operators. The device environment comprises many manufacturers reaching customers through retail outlets, or leverage application provider-owned distribution channels.

IV. Cellular M2M Architecture

An embodiment of an end-to-end architecture 400 for an M2M service in the context of the service delivery environment involving cellular access network and an M2M provider is shown in FIG. 4. For the purposes of illustration, in this particular embodiment, a CDMA (Code Division Multiple Access) 2000 EV-DO (Evolution-Data Optimized, also referred to as High Rate Packet Data (HRPD) system) access network is assumed. The architectures for other access networks, such as GPRS (General Packet Radio Service), UMTS (Universal Mobile Telecommunications System), LTE (Long Term Evolution), WiMAX, UMB (Ultra Mobile Broadband), etc., are similar and corresponding network components are denoted in the table of FIG. 5. One skilled in the art will realize how security provisioning principles of the invention may be applied to such other access networks in a straightforward manner.

As shown in FIG. 4, the mobile cellular network used by a plurality of M2M devices 402-1 through 402-M is comprised of a base station (BTS) 404, a radio network controller (RNC) 406, a packet data serving node (PDSN) 408, and a home agent (HA) 410. It is to be understood that, while only a subset of network elements are shown in FIG. 4 for purposes of simplicity, the cellular network may typically include many BTSs connected to one RNC, and many RNCs connected to one PDSN, and a few PDSNs connected to one HA. These network elements are owned and operated by a cellular network provider 412. It is to be noted that, in the illustrative embodiments described herein, we generally refer to the radio access network (composed of the BTSs and RNCs in an HRPD network) and the core network elements (composed of the PDSNs and HAs in an HRPD network) of a mobile network simply as the "access network." Thus, network 412 may be considered as the access network.

Further, as shown, elements of the M2MO network of M2MO 414 comprise an Authentication, Authorization and Accounting (AAA) module 416, a bootstrap server 417, and an M2M service gateway (MSG) 418. Like the mobile cellular network discussed above, it is to be understood that, for simplicity, FIG. 4 does not show every element that may be in the M2MO network. By way of example only, there may also be multiple AAA servers, multiple MSG servers, multiple bootstrap servers, as well as billing servers, firewalls servers, etc. The AAA 416 holds the subscriber database and the security functions for authentication and authorization and provides session keys for link layer encryption and integrity protection. The M2M service gateway 418 is the interface to the application server 420 of the application provider 422 and provides a variety of communication services such as secure store and forward messaging, device diagnostics and management, automated provisioning, provisioning, deactivation and device retirement, monitoring and alerts, fraud controls, roaming controls, and device address resolution. In some deployments, the HA functionality may be owned by the M2MO. As will be explained, the bootstrap server 417 is used in the inventive security provisioning protocols of the invention, as described below in the context of FIGS. 6A through 6E, to create a root-key for use by one or more the end-user devices 402-1 . . . 402-M.

The M2M service architecture 400 also comprises an application server 420 operated by an application provider 422. It is to be understood that, after a device (402-1 . . . 402-M) creates a root key with the bootstrap sever in accordance with principles of the invention, the device can communicate with the application server 420 in a secure communication environment. Thus, in the case of the device being a smart utility meter in a home, the device will automatically send utility information about the home to the application server 420 operated by a utility company. The utility company can also send information (e.g., control commands, etc.) to the device in accordance with the secure communication environment.

It is to be appreciated that the architecture of FIG. 4 is intended to be one illustrative embodiment, and thus more or less elements may be part of the overall architecture 400. Also, it is to be understood that functionalities, shown as separate blocks in FIG. 4, may be combined to reside on the same server or communication device. By way of example only, software components that implement the bootstrap functions and the M2M service gateway functions or the AAA functions could reside on the same server or communication device. However, the invention is not limited to any particular function/server allocation.

Each M2M device (402-1 . . . 402-M) may be equipped with a cellular modem (called an M2M module), in which case, the M2M device can be connected directly to the cellular network via BTS 404. Typical examples of such M2M devices are vending machines, point-of-sale terminals, and tracking devices. In this case, the machines and the M2M modules on them are typically owned by the machine owner. The cellular subscription required for connectivity is typically provided by the M2M operator. Alternately, an M2M operator or MVNO may not be involved and the subscription may be directly with a mobile network operator.

In some instances, especially involving multimedia sessions, invoking an M2M application may require the need to connect to an IMS (IP Multimedia Subsystems) server (not shown) owned by the M2M operator. In order to accomplish this connection, IMS layer secure registration is used which requires a key. Such a key (as well as any other keys) may be derived in a straightforward manner from the bootstrapped key created in accordance with one or more illustrative protocols of the invention.

V. Security and Bootstrapping Features

The security features of the illustrative solution provided by the invention are drawn from the need to protect the various entities in the end-to-end solution from perceived threats. Examples of the threats experienced by each of the entities identified in the previous section are described. Then, the security features of the invention implemented to address these threats are explained.

Customer/M2M Device User: Devices can be hijacked by adversaries for the data they provide or for their actuation capabilities by pretending to be the back-end application server. A scenario where such an attack could be of some economic value to the adversary is remote control of home automation devices such as alarms and garage door openers. By pretending to be the network based home automaton server, miscreants can deactivate the alarm and open doors to enter the house. Devices should be protected from unauthorized entities trying to communication to and from the devices. In many M2M applications, the data collected from the M2M devices are sensitive in nature. For example, in a child tracking application, it should not be possible for unauthorized persons to acquire information about the location of the child. Thus, the M2M security solution should be such that it is not possible to acquire information about the data collected by eavesdropping at any point in the network. Identity is valuable information as it can be correlated with other data such as the location of network elements from which this identity information is retrieved to discern some patterns. In some applications, it is important that the identity of the end customer is not available. Thus, transmission of the actual identity of the device unencrypted is not acceptable since the device and or its usage can be tracked by adversaries eavesdropping in the network.

Access Network Provider: Unlike in the case of consumer electronic devices, in many cases, M2M devices are owned by the application providers and deployed in premises that are not constantly physically monitored or protected. For example, in the case of smart metering, the meters are typically owned by the utility companies and deployed in homes and small business locations. These devices are thus more susceptible to theft. Misuse of stolen communication modules found in these devices for the purpose of regular internet communication such as web browsing should not be allowed.

M2M Operator: The threats to an M2M Operator include all those applicable to a network operator. Additionally, it will be the responsibility of the M2M Operator to ensure service availability to application providers and guarantee data sent to application provider data centers was not tampered with.

Application Provider: Adversaries may benefit from modifying the data transferred from the device to the back-end application server or vice versa through man-in-the middle attacks. It should thus be possible to verify the integrity of data transferred between the entities.

It is possible for some devices to pretend to be other devices in the network and upload data to the back-end server. For example, in the smart metering service where meter data is collected from the various meters, a deviant home owner might alter the meter identification so that it appears to be a neighbor's meter to the application server, thereby avoiding paying for use of electricity. Another possible threat is for an adversary to send false information to the server by pretending to be a legitimate device. For example, in a prisoner tracking service, another device could act like the prisoner's device and falsely report the location while the true device is destroyed.

Based on the above threats, illustrative principles of the present invention provide the following security features:

(i) Mutual Authentication: Only authenticated M2M devices can access the network and M2M system, and conversely any M2M device should authenticate the server before accepting any data such as commands or management related updates. This will ensure that the back-end server that is collecting data from an M2M device should be assured that the data is coming from a legitimate, correct device and the device is guaranteed that it is communicating with a legitimate server. Observe that mutual authentication procedures have to be completed between the M2M device and the M2M operator network, before initiating data transfer.

(ii) Confidentiality: Data transfer between the M2M device and the application server should be confidential.

(iii) Integrity: The application server should be able to verify the integrity of the data received from the device. Similarly, the device should be able to verify the integrity of the data received from the application server.

(iv) Exclusivity: The communication device in the machine module should not be capable of being used for other applications. When the network provider entity is separate from the application provider entity, this feature implies that the network provider has to prevent service to a tampered device.

(v) Anonymity: The identity of the M2M device should not be revealed to an eavesdropper in the network.

Recall that, in the cellular M2M context, there is a potential for a plethora of devices and many applications provided by a few virtual operators leveraging a mix of access networks. Therefore, in accordance with illustrative embodiments, several constraints are imposed on the security solution and, in particular, the bootstrapping of keys. These constraints are as follows:

(i) Complex Environment: It is expected that there will be a multitude of device vendors participating in a relatively open environment selling low-cost devices directly to consumers.

For instance, as described above, the complex environment may involve device manufacturers selling in open market while service provider may not have a business relationship with the device provider.

Alternatively, in residential applications such as metering, the end-user (home-owner) may not even know the virtual network operator who is providing the service on behalf of the owner of the organization which owns the application, but yet securing the application is critical to all entities in the chain.

(ii) Scalability: M2M services typically involve a large number of devices each sending a small amount of data. The revenue per device is generally small for any of the entities in the value chain. Thus, it is important to minimize expenses incurred in deploying and maintaining these devices. One of the key steps in the deployment of devices is the provisioning of the device in the appropriate databases of the network and application provider. In particular, provisioning of keys or other information for the security solution should be simple and scalable. The provisioning process can not assume that the device will turned on at a known pre-arranged specific time. Devices may be turned on temporarily at the manufacturing site for testing but then subsequently turned off until deployment. It can be installed at one time but then the communication may only be turned on later. Thus, it is not possible to predict a particular time for a provisioning process to be executed. The bootstrapping application should therefore be as automated as possible, given the volume of devices involved in the environment. In fact, any manual intervention (offline or otherwise) should be limited to consumers keying in a few pieces of data into an online database (if need be) or use a command line interface on the device if one is available.

(iii) Bootstrapping Needs Network Authentication: More importantly, it may be assumed that the network operator (who provides bandwidth to the M2M operator) will not be able to tell when a device is executing a bootstrapping application. For instance, this constraint requires that a device authenticate itself with the mobile data network using a network access identity (e.g., NAI (Network Access Identifier), IMSI (International Mobile Subscriber Identifier), etc.) that allows the network operator to 'recognize' the device and 'authorize the call' despite the fact that the device is not ready with keys. In other words, the bootstrapping protocol should assume that the M2M system is an overlay over existing (and deployed) cellular systems, thereby requiring devices to successfully register with the access network before the bootstrapping application is invoked, and such registration procedures should comply with existing cellular networking standards.

(iv) Flexibility in Operator Selection: In addition to the above constraints, it may be assumed that the application provider may choose to switch M2M operators at any point of time (for various business reasons). This in turn requires that any bootstrapping procedure has to provide perfect forwards and backwards secrecy, with no leakage of key material across operator boundaries. Additionally, this requirement has to be met with little or no human intervention.

Given these constraints, the overall bootstrapping problem is to ensure security requirements are met and there are no compromises at the device, link, network, or application layer. It should be understood, however, that principles of the invention are not limited to implementations within the above constraints. That is, principles of the invention are applicable to other environments in which there is a security bootstrapping need.

VI. Bootstrapping Protocol

Recall that bootstrapping a key that the device and M2M operator can then use, requires network authentication. Observe that, since the M2M operator is treated as a MVNO as far as the network is concerned, network authentication in this context will have to be supported by the M2M operator. In other words, bootstrapping a key is a legitimate application, which in turn requires secure registration with the access network. The remainder of this section provides a secure solution to this problem. In particular, the inventive solution ensures that the operator network (i.e., mobile cellular network) need not have to be upgraded to accommodate this protocol.

In one particular embodiment of the inventive solution, the framework proposed is based on the concept of Identity Based Encryption (IBE). This allows for elimination of the need for a large scale Public Key Infrastructure (PKI). Moreover, the bootstrap procedure of the invention allows for authenticated key exchange and eliminates the problem of passive key escrow, as will be explained below.

Prior to an explanation of an embodiment of an identity-based M2M bootstrap protocol, general principles of IBE are provided.

An Identity Based Encryption protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

IBE involves the following mathematical tools and parameters:

Let E be an elliptic curve over a finite field F, and let P be a point of large prime order.

Let $e: E \times E \rightarrow G$ be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

Encryption$_A(m)=(rP, m\ xor\ H_2(g_A^r))$; in other words the encryption output of m has two coordinates u and v where $u=rP$ and $v=m\ xor\ H_2(g_A^r)$. Note that "xor" refers to the exclusive OR logic function.

In order to decrypt (u,v), A recovers m using the following formula:

$$m = v\ xor\ H_2(e(d_A, u)).$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

Turning back now to the setup for the identity-based M2M bootstrap protocol, recall that the setup for IBE involves an 'identity' for every participant (e.g., domain name, device name, etc.) which is used as a public key (or part of a public key) and a private key issued by a Key Generation Function (KGF). In addition, the public parameters of the KGF are used in the encryption process. Further known details of IBE can be found in the above-referenced Boneh and Franklin article.

In the bootstrap protocol of the invention (also referred to herein as the security provisioning protocol), each M2M device uses a machine readable, unique, and known public identity (like an Electronic Serial Number (ESN)) as part of a public key. Additionally, the public key may include an 'expiry date' concatenated with the machine readable portion. The manufacturer works with a publicly endorsed Key Generation Function entity which issues private keys corresponding to the public key of the device. The (public key, private key) pair is unique to manufacturer and device, and pre-provisioned in every device.

Similarly, principles of the invention propose use of a 'public identity' (e.g., domain name) and corresponding (public key, private key) pair associated with the bootstrap server as well.

The public parameters of the KGF used by the device are published by the manufacturer, and known in advance to the bootstrap server.

Similarly, the public parameters of the KGF used by the bootstrap server will be known in advance. However, since the identity of the M2M operator is not known in advance, and different operators may use different KGFs, the manufacturer will pre-provision a list of operators and corresponding public parameters into the device.

In addition to identifying a device using an Electronic Serial Number (ESN) which is typical to any hardware device, the network shall identify the device (or subscription) using a Network Access Identity (NAI) which is typically of the form 'user@realm' where realm is typically an Internet domain name that uniquely identifies the operator who provides the service. However, when a device is being provisioned, the NAI may not be available in advance. Hence, principles of the invention propose to use a pre-provisioned 'Extended Electronic Serial Number' (E-ESN) as the Bootstrap-NAI (B-NAI), with a choice of multiple realms pre-provisioned in the device.

In the context of cellular M2M applications, the permanent NAI (after successful bootstrapping) could be the 'static location' of the device (for metering applications) or a 'username' chosen by the end-user for mobile applications installed in cellular handsets, while the realm corresponds to the M2M service provider.

Given this setup, the bootstrap protocol of this particular embodiment of the invention executes an Identity Based Authenticated Key Exchange (IBAKE). IBAKE is described in the U.S. patent application identified by Ser. No. 12/372, 242, filed on Feb. 17, 2009, the disclosure of which is incorporated by reference herein. This IBAKE protocol allows the device and server to mutually authenticate each other, and derive a key that provides perfect forwards and backwards secrecy. Additionally, it ensures security against passive key escrow (even though the KGF's are aware of the private keys). The above mentioned properties, i.e., perfect secrecy and security against passive key escrow, are important to ensure that application providers can switch between operators for various reasons; without perfect secrecy and passive escrow there is a possibility of leakage of key material across M2M operator domains.

Referring now to FIGS. 6A through 6E, various embodiments of the inventive bootstrap protocol will be described. In general, the inventive bootstrap protocol creates a root-key between an end-user device and a root-key server owned by the virtual network operator.

FIG. 6A describes offline steps associated with one embodiment of the bootstrap protocol. In general, FIG. 6A depicts one example of how the make and identity of the end-user device including the (ESN, B-NAI) pair is entered into the service provider database (via bootstrap server) through an offline web interface. For instance, a water company technician enters the make and identity of a water meter modem into a secure website owned and operated by the M2M Operator. The service provider contacts a public website owned and operated by the device manufacturer to obtain the public parameters of the KGF associated with the device in addition to a group password that applies across multiple devices specific to the manufacturer. This group password is a temporary key used only during registration prior to bootstrapping, and is intended to allow the device to be 'authenticated' in the mobile operator network by the relevant AAA or HSS. This is particularly useful when the device connects to a GSM or 3GPP based 3G network which relies on authentication done in the visited mobile network but the authentication vector itself is generated by the HSS. In our case, the group password will be used to generate the authentication vector. This ensures that the proposed procedure does not require any upgrades to existing networks, and is fully standards compliant.

Thus, as shown in FIG. 6A, the group password and private key are provisioned between a given device and the device manufacturer security server/KGF in step 602. Note that the KGF generates the private key and can be a separate entity from the device manufacturer security server. Alternatively, the KGF can be part of the device manufacturer security server.

The service provider bootstrap server (e.g., bootstrap server 417 in FIG. 4) logs in to the device manufacturer secure website using a standard web-based procedure managed by the device manufacturer. Note that secure interaction is needed only for PAK based bootstrap approach (to be explained below in section VII). However, security may already exist for other reasons such as supply chain management.

In step 606, the service provider bootstrap server then requests the parameters for one or more devices (e.g., 402-1 . . . 402-M in FIG. 4). In a web-based embodiment, this is done by sending an HTTP GET message to the device manufacturer secure website.

The requested parameters are obtained from the security server/KGF in step 608.

The device manufacturer secure website, in step 610, then sends the parameters in a parameter file to the service provider bootstrap server. In a web-based embodiment, this is done by sending an HTTP 200 OK response message to the bootstrap server. Again, in the web embodiment, this stage of communication between the bootstrap server and the device manufacturer secure website is part of a standard web-based encrypted exchange.

Assuming the above offline setup has occurred, FIG. 6B illustrates an embodiment of the online portion of the bootstrap protocol. It is to be understood that the distinction between "offline" and "online" here has to do with the bootstrap protocol and the device. That is, when the device is participating in the bootstrap protocol over a wide area network that will then be used to transmit data after bootstrap, then this is referred to as the online stage, while any other time may be considered part of the offline stage. However, other definitions of online and offline may be implemented.

It is first assumed that in step 612, the bootstrap server and the AAA server (e.g., 416 in FIG. 4) provision the above-mentioned bootstrap NAI (B_NAI) and the group password.

In step 614, the given M2M device (e.g., 402-1 in FIG. 4) attempts to acquire an access network (e.g., 412 in FIG. 4), i.e., the device performs network acquisition. It is realized that when a device powers up for the first time, the access network identity (as well as corresponding radio parameters such as carrier frequency, etc.) and the realm of the M2M operator may not be known in advance. In such scenarios, the device will search through a list of possibilities for these values and picks the appropriate pair. These choices are pre-provisioned by the manufacturer for a given market and variety of providers. This step is performed in conjunction with the next step, wherein a choice of 'realm' is admissible or not based on whether network authentication is successful.

In steps 616 and 618, the device and the AAA server perform access authentication through the access network using the B-NAI and the group password. That is, access authentication procedures are executed between the device and the M2M operator authentication infrastructure (i.e., AAA server).

The access authentication procedures are access networks standards dependent. But independent of the access network type, the procedure involves the access network treating the device as a roaming device. Specifically, the device presents the B-NAI along with the realm of the M2M operator in its request for authentication. If the access network recognizes the realm, then the request for authentication will be forwarded to the M2M operator authentication (AAA) server.

The authentication (AAA) server will then recognize the B-NAI and perform a check to see if bootstrapping is complete or not. If not, then the device and access network authenticate each other using the group password pre-provisioned in the device and obtained by the server in step 612. Success or failure of this procedure is reported to the access network, along with a temporary session key to be used for link layer integrity and privacy.

Alternatively, the access network may receive a 'vector' of authentication attributes from the authentication (AAA) server. The 'vector' is prepared by the authentication server using the above mentioned group password for this specific B-NAI. Subsequent mutual authentication and session key agreement are performed by the access network, on behalf of the authentication server. For details of access authentication procedures, reference may be made to the specific network security documentation, e.g., for 3GPP, see www.3gpp.org; for 3GPP2, see www.3gpp2.org; and for WiMAX, see www.wimaxforum.org.

Note that, while the device has been authenticated into the mobile access network, the authorization policies will limit the applications the device can have access to until the completion of bootstrapping procedures. Observe that, there are no security requirements related to the 'group password' used in this step. In fact, it is to be appreciated that one could ignore this password, and by-pass access authentication, without sacrificing on security since this is specific to operating the bootstrapping procedure and not for regular communication. However, bypassing authentication may require an upgrade to the operator network and would therefore stray from a preferred goal of minimizing the alteration to standard protocols that are employed via the access network. Nonetheless, if such a goal is not desired, then the access authentication could be bypassed as mentioned above.

In step 620, a link and network session setup is performed between the device and the access network. That is, upon successful authentication and session key agreement, the device is assigned a link layer identity and an IP (Internet Protocol) address at the network layer. The procedures are access network specific. This allows the device to communicate through the access network.

In step 622, upon successful acquisition of link and network layer identities, the device sends a bootstrap key agreement request message to the bootstrap server, along with its B-NAI and identity based public key. Observe that this message may be encrypted and/or integrity protected based on the access network requirements and standards. More importantly, the access network treats this as a traffic packet. Recall that the access network home gateway will filter all packets and forward all packets from an M2M device IP address to a fixed M2M operator server.

In step 624, the bootstrap server acknowledges request, and sends a set of parameters relevant to the type of authenticated key exchange that will be performed. While the invention is not limited thereto, one embodiment utilizes the above-mentioned Identity Based Authenticated Key Exchange (IBAKE—which is described in detail below in the context of FIG. 6C) and another embodiment utilizes the above-mentioned Password Authenticated Diffie-Hellman Key Exchange (PAK—which is described below in detail in the context of FIG. 6D).

Figure 6C:
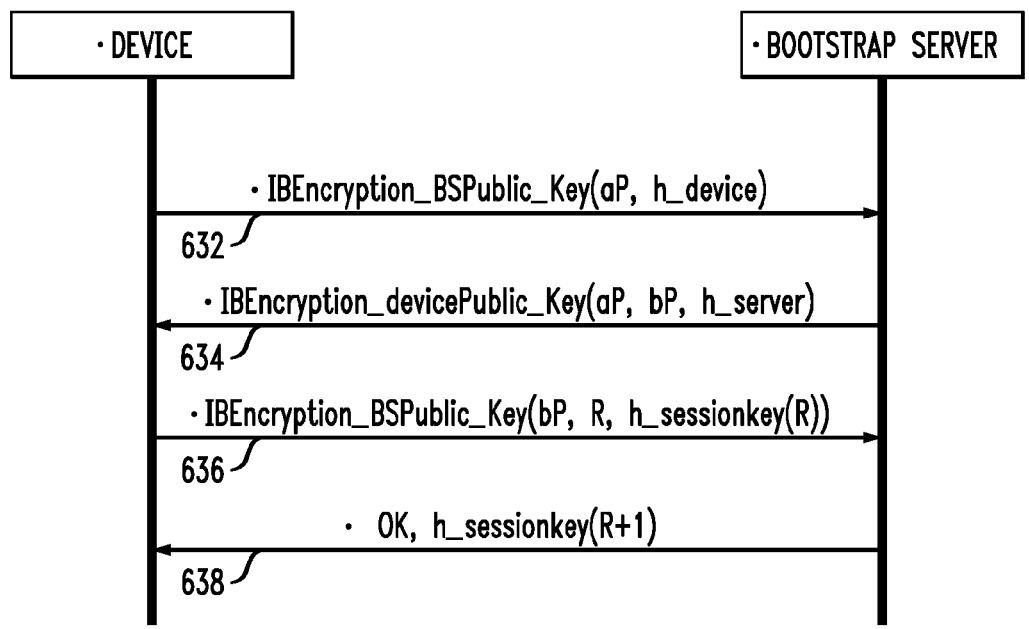
FIG. 6C is a flow diagram illustrating an identity-based authenticated key exchange protocol in accordance with an embodiment of the present invention.

Thus, with regard to step 626, we first describe the IBAKE-based embodiment, and divert to FIG. 6C, then return to FIG. 6B. Note that in section VII below, we describe the PAK-based embodiment in the context of FIGS. 6B and 6C.

Recall that details of IBAKE are described in the U.S. patent application identified by Ser. No. 12/372,242, filed on Feb. 17, 2009, the disclosure of which is incorporated by reference herein. Before describing the specific implementation of IBAKE to this bootstrapping context, we provide some basic explanation of the IBAKE procedure.

The basic setup for IBAKE involves the mathematical constructs and parameters discussed above with respect to IBE. Recall that this protocol is asymmetric but does not require any PKI support; instead the protocol employs an offline server which serves as a Key Generation Function. The details of the protocol are outlined below:

Suppose A, B are the two entities (or parties, where A represents a first computer system and B represents a second computer system) that are attempting to authenticate and agree on a key. We will use A and B to represent their corresponding identities, which by definition also represent their public keys. Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$. Let x be a random number chosen by A, and let y be a random number chosen by B.

Assuming these mathematical constructs and parameters, a typical IBAKE exchange may comprises the following steps. A computes xP (i.e., P added to itself x times as a point on E, using the addition law on E) encrypts it using B's public key, and transmits it to B. In this step, encryption refers to identity based encryption described above. Upon receipt of the encrypted message, B decrypts the message and obtains xP. Subsequently B computes yP, and encrypts the pair {xP, yP} using A's public key and then transmits it to A. Upon receipt of this message, A decrypts the message and obtains yP. Subsequently, A encrypts yP using B's public key and sends it back to B. Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times. Note that any application of the protocol may utilize header data with the identities to ensure proper functioning of the protocol. This is relatively standard and applicable to almost any protocol exchange for key agreement.

Note also that x is random but xP provides no information about x. Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f is hard to compute without knowledge of x or y, and the output is of a satisfactory length from a cryptographic perspective, e.g., around 128 bits or more.

Some of the properties of the protocol include:

Immunity from key escrow: Observe that all the steps in the protocol exchange are encrypted using IBE. So clearly the KGF can decrypt all the exchanges. However, the KGF can not compute the session key. This is because of the hardness of the elliptic curve Diffie-Hellman problem. In other words, given xP and yP, it is computationally hard to compute xyP.

Mutually Authenticated Key Agreement: Observe that all the steps in the protocol exchange are encrypted using IBE. In particular, only B can decrypt the contents of the message sent by A in first and third steps, and similarly only A can decrypt the contents of the message sent by B in the second step. Moreover, at the end of the second step, A can verify B's authenticity since xP could have been sent only after decryption of the contents in by B. Similarly, at the end of the third step, B can verify A's authenticity since yP could have been sent back only after correctly decrypting the contents of the second step and this is possible only by A. Finally, both A and B can agree on the same session key. In other words, the protocol is a mutually authenticated key agreement protocol based on IBE.

Perfect forward and backwards secrecy: Since x and y are random, xyP is always fresh and unrelated to any past or future sessions between A and B.

No passwords required: Clearly, the inventive protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

Given this basic explanation of the IBAKE procedure, we now describe the specific implementation of IBAKE to this bootstrapping context with reference to FIG. 6C.

In the IBAKE-based embodiment performed between the device and the bootstrap server, recall that this includes a choice of elliptic curve, pairing, a chosen point P on the elliptic curve, and the public key of the bootstrap server. Additionally, a choice of cryptographic hash functions to be used in the protocol may also be included.

Thus, it is assumed that the device chooses a random number 'a' and computes aP on the elliptic curve. In addition, device computes h(device)=HASH(groupkey, Public Key of device), where HASH is one of the cryptographic hash functions (e.g., SHA1) from the choices indicated in the previous step. These two parameters are then encrypted using the public key of the bootstrap server and the public parameters of the KGF of M2M operator pre-loaded in the device based on the IBE protocol described above. Observe that calculation of h is an optional optimization, and is not required for ensuring the security of the bootstrap protocol. Alternatively, the entire public key of the device could be used without hashing. Using the entire public key can allow for steps 622 (of FIG. 6B) and this step to be independent of each other.

In step 632, the device transmits the above encrypted value back to the bootstrap server.

The bootstrap server decrypts the message, obtains both the device's key contribution aP and the public key (either from step 622 or what was received in step 632). The bootstrap server chooses a random number 'b' and computes bP on the elliptic curve. In addition, the bootstrap server computes h(server)=HASH(groupkey, Public Key of Server), where HASH is the cryptographic hash functions (e.g., SHA1) indicated by the device in the step 624 (FIG. 6B). The server then creates a message comprising {aP, bP, h(server)} and encrypts it using the public key of the device and public parameters of KGF associated with the device based on the IBE protocol described above.

In step 634, the bootstrap server transmits the above encrypted value back to the device.

The device decrypts this message, and verifies if the first component of the message sent by the bootstrap server is equal to the key component it chose prior to step 632. This allows for the device to authenticate the server. Next, the device extracts 'bP' from the decrypted message, and computes the session key 'abP' using a and bP. Next the device chooses a random number R and computes h(R)=HASH (session key, R). The string {bP, R, h(R)} is then encrypted using the public key of the bootstrap server and the public parameters of the KGF of M2M operator pre-loaded in the device based on the IBE protocol described above. R and h(R) are needed for key confirmation.

In step 636, the device transmits the above encrypted value back to the bootstrap server.

The bootstrap server decrypts the message using its private key, extracts bP and verifies that it is equal to the value of key component that was chosen prior to step 634. This allows the server to authenticate the device. Next, the bootstrap server computes the session key=abP, using aP and b following which the bootstrap server can confirm that the same session key was obtained at both ends. The bootstrap server then increments R by 1, and computes h(R+1)=HASH(R+1, session key).

In step 638, the bootstrap server transmits an OK message, along with h(R+1) to the device.

Advantageously, this session key abP, agreed upon between the device and the bootstrap server, serves as a secure root-key between the device and the M2M operator.

Returning now to the overall protocol outlined in FIG. 6B, provisioning is then completed in step 628. That is, upon successful completion of IBAKE (or PAK below) procedure, the bootstrap server then sends a permanent NAI along with other service specific permanent parameters (e.g., server domain name). Additionally, the M2M operator may install specific software routines (e.g., device management software) that are customized to the application provider. As a further optimization, step 628 could be combined with step 638 (of the IBAKE procedure in FIG. 6C).

Also, in step 630, the bootstrap server sends the permanent NAI and root key (abP) to the authentication (AAA) server, such that the device is provisioned.

It is to be appreciated that the steps of FIG. 6B may be repeated if the application provider chooses to switch M2M operators, ensuring that flexibility requirements are met. Also, it is to be appreciated that FIG. 6B illustrates steps that are considered useful to an understanding of principles of the invention, however, not all steps are required to implement the inventive principles and other steps may be added. Also, one skilled in the art will understand that certain of the steps may be rearranged in order of operation.

We describe how a device upon bootstrapping will continue to operate securely. While we begin with a reference to a specific use case, with a view towards simplifying the exposition, we have ensured that the salient aspects are abstracted so that the operation applies independent of the scenario.

A. Use case: Consider a residential device transmitting data to a server in an application provider network. We will assume the template of relationships described above in section IV with respect to FIG. 4. Furthermore, we may assume that the network under consideration is an HRPD network based on the 1×EvDO standards.

B. Establishing identities: As a first step, the mobile has to obtain a link layer and network layer identities from the access network. This involves the following steps:

(i) Mutual Authentication: The device registers with the network, through a mutual authentication protocol using a Network Access Identity (NAI). The registration and authentication process is managed by authentication infrastructure that is owned and operated by the M2M operator. That is, when the access network receives a registration request it will recognize the NAI as belonging to the M2M operator and use it to route authentication protocol packets to the appropriate M2M authentication server. In other words, the device will be treated similar to a 'roaming mobile' in contemporary cellular networks. Alternatively, the access network may receive authentication data, including nonces, challenge responses and session keys from the M2M authentication server for the specific device and hence may be able to locally proxy the authentication process. Overall, this step ensures that the link layer authentication requirements are met.

(ii) Anonymity: The M2M operator uses an NAI that does not reveal the identity of the device. Observe that in the bootstrap procedures, there was a need to use a 'bootstrap NAI' which again should not reveal the identity of the device. Once bootstrapping is successful, as part of the provisioning process, a permanent NAI that does reveal the device identity will be provisioned. The use of a permanent NAI, that does not reveal the device identity, will ensure anonymity during the registration process. Following registration, all packets exchanged during a session will use an IP address (and link layer identity in the wireless link) which are agnostic to the device identity. The union of these procedures ensures anonymity.

(iii) Identity Assignment: Following successful authentication, the access network commences registration processes. This includes assigning a link layer identity and an IP layer identity. Observe that the network layer in mobile broadband networks is typically implemented across two different gateways—one in the visited network, and another in the home network. In the context of 1×EvDO, the former gateway is a Packet Data Service Node (PDSN) and the latter is a Home Agent (HA). These are standards specific network elements, and a split in network layer functionality is intended to abet mobility and roaming. Hence, it is important to observe that the IP layer identity involves working across multiple network elements and perhaps involves two IP addresses (e.g., Mobile IP).

C. Policies: Once link layer and network layer identities are assigned, several policies are invoked in various network elements. These are intended to enable seamless routing as well as to ensure the access network is not misused. Clearly, the absence of these policies will lead to a violation of exclusivity requirements. For instance, for the given device (or identity):

Link layer Confidentiality and Integrity: The radio network shall mandate encryption and integrity protection in the link layer in order to partially meet the confidentiality and integrity requirements.
  Link layer Exclusivity: Simultaneously, the PDSN (or more generally the visited gateway) will transmit and receive packets only from specific radio-link layer termination nodes and a specific HA (or more generally a specific home gateway).
  Network layer Exclusivity: Similarly, the HA will apply simple filtering rules and source IP address forwarding rules by which any packet from a given source IP address (recognized as a 'machine device') will be forwarded only to a specific M2M operator server.

D. Authorization: Observe that, registration and identity assignment also ensure that the M2M server network can start a 'session' for the given device. This is also accompanied with invoking several policies, related to the type of applications and servers the device is allowed to access, that are enforced by the M2M operator.

E. Session Confidentiality and Integrity: Following this, the device can set up an application layer session with a server in the M2M operator data center. The session will be secured hop-to-hop. That is, the radio link layer is protected using access network specific link layer security mechanisms, following which the link between the radio link termination node and the cellular core IP network is protected using an operator specific IP tunnel, followed by a VPN tunnel between the mobile network operator network and the M2M operator network. Once data reaches the M2M operator network, there may be some aggregation and post-processing performed before transmitting data to the application provider servers.

VII. Alternative Bootstrapping Protocol

In this section, we describe an alternative bootstrap protocol that is not based on IBAKE, but instead relies on Password Authenticated Diffie-Hellman Key Exchange (PAK). This method allows the use of the group password, in combination with Diffie-Hellman Key Exchange, to authenticate the device during bootstrap while simultaneously eliminating the need to provision private keys corresponding to the device. However, given that multiple devices use the same password, there are security limitations and may apply only to limited scenarios where security administrators can have tight control over the devices being added to the network. In what follows, we describe the details of this protocol. Note that we will refer back to the overall offline and online stages of the bootstrap protocol of FIGS. 6A and 6B, respectively. Then FIG. 6D will be used to explain step 626 of FIG. 6B, i.e., the authenticated key exchange operation.

Again, the following assumptions are made in this particular embodiment. We will use a group key that is unique to the manufacturer pre-provisioned in every device. In addition, we assume every device can be identified using an Electronic Serial Number (ESN) which is typical to any hardware device, in addition to a Network Access Identity (NAI) which is typically of the foam 'user@realm.' However, when a device is being provisioned, the NAI may not be available in advance. Hence, we will use a pre-provisioned 'Extended Electronic Serial Number' (E-ESN) as the bootstrap NAI (B-NAI), with a choice of multiple realms pre-provisioned in the device. In the context of cellular M2M applications, the permanent NAI (after successful bootstrapping) could be the 'static location' of the device (for metering applications) or a 'username' chosen by the end-user for mobile applications installed in cellular handsets, while the realm corresponds to the M2M service provider.

Given this setup, we establish a Diffie-Hellman based Password Authenticated Key Exchange (PAK) using the group key along with the identities to compute the 'password hash' in PAK. By way of example only, a Diffie-Hellman based password authenticated key exchange, as described in V. Boyko et al., "Provably Secure Password-Authenticated Key Exchange Using Diffie-Hellman," Euro-Crypt 2000, pp. 156-171, 2000, the disclosure of which is incorporated by reference herein, may be employed. The security of this protocol relies on the quasi-secrecy of the group key and identities. While the NAI may be transmitted over the air, the ESN will be used in calculating the password hash along with the group key. In what follows, we describe the details of the protocol and discuss advantages and limitations of the protocol.

Again, the bootstrap protocol creates a root-key between an end-user device and a root-key server owned by the virtual network operator.

Recall that FIG. 6A described above explains an offline stage of the protocol wherein the make and identity of the end-user device including the (ESN, B-NAI) pair is entered into the service provider database through an offline web interface. For instance, a water company technician enters the make and identity of a water meter modem into a secure website owned and operated by the M2M operator. The service provider contacts a database owned and operated by the device manufacturer for a group key associated with the device. This offline step is intended to create an association between a device and a subscription as well as enable the service provider to obtain a group key.

Then recall that in the online stage depicted and described in the context of FIG. 6B, network acquisition is performed (step 614). That is, when a device powers up for the first time, the access network identity (as well as corresponding radio parameters such as carrier frequency, etc.) and the realm of the M2M operator may not be known in advance. In such scenarios, the device will search through a list of possibilities for these values and picks the right pair. These choices are typically pre-provisioned by the manufacturer for a given market and variety of providers. This step is performed in conjunction with the next step, wherein a choice of 'realm' is admissible or not based on whether network authentication is successful.

Recall further that bootstrap authentication, i.e., steps 616 and 618 of FIG. 6B, are performed. This operation is executed between the device and the M2M operator authentication infrastructure. The procedures are access networks standards dependent. But independent of the access network type, the procedure involves the access network treating the device as a roaming device. Specifically, the device presents the B-NAI along with the realm of the M2M operator in its request for authentication. If the access network recognizes the realm, then the request for authentication will be forwarded to the M2M operator authentication server. The authentication server will then recognize the B-NAI and perform a check to see if bootstrapping is complete or not. If not, then the device and the access network authenticate each other using the group password pre-provisioned in the device and obtained by the server in the step above. Success or failure of this procedure is reported to the access network, along with a temporary session key to be used for link layer integrity and privacy. Alternatively, the access network may receive a 'vector' of authentication attributes from the authentication server; the 'vector' is prepared by the authentication server using the above mentioned group key for this specific B-NAI. Subsequent mutual authentication and session key agreement are performed by the access network, on behalf of the authentication server.

Recall also that link and network layer identities are set up, i.e., step 620 of FIG. 6B. Upon successful authentication and session key agreement, the device is assigned a link layer identity and an IP address at the network layer. The procedures are access network specific. This allows the device to communicate through the access network.

Then, recall that in step 622 of FIG. 6B, upon successful acquisition of link and network layer identities, the device sends a bootstrap key agreement request message to the bootstrap server, along with its B-NAI. Observe that this message may be encrypted and/or integrity protected based on the access network requirements and standards. More importantly, the access network treats this as a traffic packet. Recall that the access network home gateway will filter all packets and forward all packets from an M2M device IP address to a fixed M2M operator server.

Next, in step 624 of FIG. 6B for this PAK-based embodiment, the bootstrap server acknowledges the request, and sends a pair of integers (g, p) where p is a large safe prime number (i.e., p is a large prime number, say 1024 bits long, and is in form p=2q+1 where q is also a prime number) and g is a generator of the cyclic group of non-zero integers modulo p. In addition, the choice of cryptographic hash functions supported is also communicated.

Figure 6D:
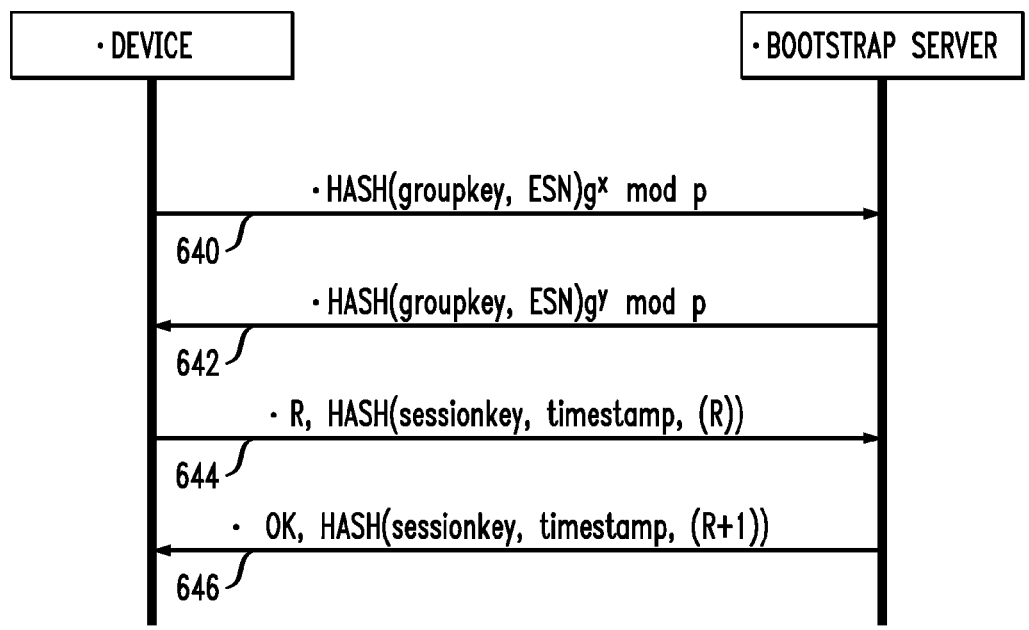
FIG. 6D is a flow diagram illustrating a password-based authenticated key exchange protocol in accordance with another embodiment of the present invention.

In step 626 of FIG. 6B, the PAK bootstrap protocol is performed, as depicted in FIG. 6D.

The device chooses a random number 'x' and computes $g^x$ modulo p. In addition, the device computes h=HASH (groupkey, ESN), where HASH is one of the cryptographic hash functions (e.g., SHA1) from the choices indicated in the previous step.

In step 640, the device transmits $h.g^x$ modulo p and the HASH function chosen to calculate h to the bootstrap server.

The bootstrap server chooses a random number 'y' and computes $g^y$ modulo p. In addition, the server computes h=HASH(groupkey, ESN), where HASH is the cryptographic hash functions (e.g., SHA1) indicated by the device in the previous step.

In step 642, the bootstrap server transmits $h.g^y$ modulo p to the device.

Both the device and the bootstrap server compute $g^{xy}$ modulo p. This is used as a root key to derive additional keys for the link, network, and application layer using known pseudorandom functions.

As shown, steps 644 and 646 are employed to conform that both the device and server derived the same key. Note that, as used in steps 644 and 646, R is a random number and incremented by the bootstrap server when returning the hash function of the derived (session) key and the timestamp.

Returning to step 628 of FIG. 6B, upon successful completion of bootstrap PAK, the bootstrap server then sends a permanent NAI along with other service specific permanent parameters (e.g., server domain name).

Note that while the PAK-based approach may not provide the same level of security (since the password used in PAK may be used by more than one device) as the IBAKE-based approach, it is to be understood that a goal of the protocol is not intended to provide air-tight security but instead provide an automated mechanism to bootstrap keys in an open device environment with reasonable security.

VIII. Application Provider Extension

The bootstrapping protocol presented herein can be extended to the model where the cellular network operator provides connectivity directly to the application providers, rather than through the M2M operator. In such a model, the device is a priori associated with the application provider, i.e., the application provider has knowledge of the device, its ESN, and NAI, and when it is being activated on the network, but is a priori unknown to the cellular network operator. This model differs from what has been proposed above in that there is no M2M operator involved, and so the device cannot be considered as roaming into the cellular network for access as was the case above. The application provider cannot be treated as an equivalent of an M2M operator because they will not have the HLR/HSS or the AAA infrastructure to act as the home network for the device.

The inventive bootstrapping protocol can be extended to this scenario as follows. The extension is depicted in FIG. 6E. The cellular network operator will create a separate "home" network for such devices with an NAI that belongs to one or more application providers. Essentially, the network operator can be viewed as providing a hosted home network for the devices on behalf of the application providers. When a device with an application provider NAI and realm initiates a connection on the access network (step 650), the device is treated as "roaming" on to the operator network from the hosted "home" network. However, this hosted "home" AAA/HLR/HSS infrastructure may not a priori be configured with the device information. This may be done dynamically by the operator by verifying with the application provider as follows.

When the hosted "home" AAA/HLR/HSS receives this NAI, it will be recognized as belonging to the application provider based on the realm of the NAI.

This will trigger the hosting server (of access network) to contact the application provider (hosted "home" network) to verify the 'identity' of the device, following which the application provider can then share the 'group password' (described above) and authorize the NAI as legitimate. This is generally illustrated as steps 652 and 654 in FIG. 6E. In this context, 'authorization data' can include, for instance, a device authorized only for a limited number of minutes of air-time, or limited number of transactions to a specific application server, etc.

Following this, the hosting server will execute link layer registration (step 620 as explained above) with the device (using the group password) and then follow it up with the bootstrapping procedures (steps 622 through 630 as explained above).

Note that if the bootstrap AAA infrastructure hosted by the cellular network operator has the device information before the device makes an access attempt, then this scenario simply reduces to the previous case but with the network operator also acting as the M2M operator. What makes this an extension is the fact that the AAA infrastructure is dynamically modified at the time of initial access as a part of the bootstrap protocol.

IX. Illustrative Computing System

FIG. 7 illustrates a generalized hardware architecture 700 of a network environment and communication devices in the form of computer systems suitable for implementing an identity-based security provisioning protocol between two entities (an open device such as an M2M device, and a bootstrap server) according to the present invention. As shown, M2M device (a first communication device) comprises a computer system 702, while the bootstrap server (a second communication device) comprises a computer system 704. The two computer systems 702 and 704 are coupled via a network 706. The network may be any network across which M2M device and the bootstrap server are able to communicate, for example, as in the embodiments described above, the network 706 could include a publicly-accessible wide area communication network such as a cellular communication network operated by a network operator (e.g., Verizon, AT&T, Sprint). However, the invention is not limited to a particular type of network. Typically, M2M device could be a client machine and the bootstrap server could be a server machine. Also, both could be clients or both could be servers. Thus, it is to be understood that the communication protocol of the present invention is not limited to the case where the computing systems are client and server, respectively, but instead is applicable to any computing devices comprising the two network elements.

Thus, it is understood that the architecture of FIG. 7 depicts two participants in the bootstrapping protocols of FIGS. 6B and 6E. It is to be appreciated that similar computing systems (communication devices) would be used to realize an implementation of the other participants in the protocols, e.g., servers associated with the network provider (e.g., access servers), servers associated with the M2M operator (e.g., AAA server), and servers associated with the application provider (e.g., application server). For the sake of simplicity, all the computing systems (communication devices) that may participate in the protocols of the invention are not shown in FIG. 7.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 7 generally illustrates an exemplary architecture for each computer system communicating over the network. As shown, M2M device 702 comprises I/O devices 708-A, processor 710-A, and memory 712-A. Bootstrap server 704 comprises I/O devices 708-B, processor 710-B, and memory 712-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing a security provisioning protocol between a first communication device and a second communication device over at least one wide area communication network, the method at the first communication device comprising steps of:

the first communication device automatically using access information not previously provisioned in the wide area communication network to gain access to the wide area communication network for an initial purpose of communicating with the second communication device; and the first communication device, upon gaining access to the wide area communication network, automatically performing an authenticated key exchange operation with the second communication device over the wide area communication network and establishing a secure communication key as a result of the authenticated key exchange operation for subsequent use by the first communication device for secure communications;

wherein the wide area communication network is operated by a first entity and the second communication device is operated by a different second entity;

wherein the first entity is a cellular communication network operator and the second entity is a machine-to-machine (M2M) operator.

2. The method of claim 1, wherein the first communication device comprises a machine-to-machine (M2M) client device.

3. The method of claim 1, wherein the second communication device comprises a bootstrap server.

4. The method of claim 1, wherein the wide area communication network comprises a cellular communication network.

5. The method of claim 4, wherein the first entity is a cellular communication network operator.

6. The method of claim 1, wherein the second entity is an M2M operator.

7. The method of claim 1, further comprising the step of storing the access information in the first communication device prior to deployment of the first communication device into an operating environment.

8. The method of claim 1, wherein the access information comprises a group password.

9. The method of claim 1, wherein the access information further comprises one or more parameters associated with the wide area communication network in the first communication device, wherein at least one of the one or more parameters are also used by the first communication device to gain access to the wide area communication network.

10. The method of claim 9, wherein the access information further comprises one or more parameters associated with at least one other communication network.

11. The method of claim 10, further comprising the step of the first communication device attempting to gain access to the at least one other communication network when unsuccessful at gaining access to the wide area communication network.

12. The method of claim 1, wherein the access information further comprises a temporary identifier associated with the first communication device.

13. The method of claim 12, further comprising the step of performing an access authentication operation over the wide area communication network between the first communication device and a third communication device operated by the second entity using the temporary identifier associated with the first communication device.

14. The method of claim 13, wherein the temporary identifier associated with the first communication device is derived from an electronic serial number assigned to the first communication device.

15. The method of claim 13, further comprising the step of performing a link layer and a network layer session setup operation, upon a successful access authentication operation, so that the first communication device can communicate with the second communication device through the wide area communication network.

16. The method of claim 1, wherein the authenticated key exchange operation comprises an identity-based authenticated key exchange protocol.

17. The method of claim 16, wherein the identity-based authenticated key exchange protocol utilizes an identity-based encryption operation.

18. The method of claim 17, wherein the identity-based authenticated key exchange protocol further comprises:

sending an encrypted first random key component from the first communication device to the second communication device, the first random key component having been computed at the first communication device and encrypted using a public key of the second communication device in accordance with the identity-based encryption operation;

receiving an encrypted random key component pair at the first communication device from the second communication device, the random key component pair having been encrypted at the second communication device using a public key of the first communication device in accordance with the identity-based encryption operation, and the random key component pair having been formed from the first random key component and a second random key component computed at the second communication device; and sending the second random key component, in encrypted form, from the first communication device to the second communication device, the second random key component having been encrypted using the public key of the second communication device in accordance with the identity-based encryption operation;

wherein the secure communication key for use in subsequent communications by the first communication device is computable at the first communication device based on the second random key component.

19. The method of claim 1, wherein the authenticated key exchange operation comprises a password-based authenticated key exchange protocol.

20. The method of claim 19, wherein the password-based authenticated key exchange protocol utilizes a Diffie-Hellman key exchange.

21. The method of claim 1, further comprising the step of performing secure communications between the first communication device and at least one of the second communication device and at least one other communication device upon a successful authenticated key exchange operation.

22. The method of claim 21, wherein the first communication device receives via secure communications a permanent network access identifier.

23. The method of claim 21, wherein the first communication device receives one or more customized software components for use in an operating environment in which the first communication device is deployed.

24. The method of claim 1, further comprising the step of performing an access authentication operation over the wide area communication network between the first communication device and a third communication device, wherein the access authentication operation uses a shared secret and a temporary network access identifier that are known to the first communication device, the second communication device, and the third communication device.

25. The method of claim 24, wherein the second communication device provides the shared secret and the temporary network access identifier to the third communication device prior to the access authentication operation.

26. The method of claim 24, wherein the second communication device obtains the shared secret and the temporary network access identifier from a manufacturer of the first communication device prior to the access authentication operation.

27. The method of claim 1, wherein the first entity is a network operator and the second entity is an application provider.

28. The method of claim 27, wherein the identity of the first communication device is a priori associated with the application provider.

29. The method of claim 27, wherein the network operator creates a home network for the first communication device with a network access identifier that belongs to the application provider.

30. The method of claim 27, wherein the application provider participates in an access authentication operation for the first communication device.

31. The method of claim 1, wherein, for the first communication device, the wide area communication network invokes one or more policies comprised of one or more of: (i) mandating an encryption and integrity protection in a link layer; (ii) transmitting and receiving packets only from specific radio-link layer termination nodes and a specific home gateway; and (iii) applying filtering rules and source IP address forwarding rules by which any packet from a given source IP address is forwarded only to a specific server of the second entity.

32. A method for performing a security provisioning protocol between a first communication device and a second communication device over at least one wide area communication network, the method at the second communication device comprising steps of:
the second communication device obtaining identification information associated with the first communication device; and
the second communication device, upon the first communication device gaining access to the wide area communication network using access information stored on the first communication device and not previously provisioned in the wide area communication network, automatically performing an authenticated key exchange operation with the first communication device over the wide area communication network and establishing a secure communication key as a result of the authenticated key exchange operation for subsequent use by the first communication device for secure communications;
wherein the wide area communication network is operated by a first entity and the second communication device is operated by a different second entity.

33. The method of claim 32, wherein the identification information further comprises an electronic serial number and a temporary network access identifier associated with the first communication device.

34. The method of claim 32, wherein the obtaining step further comprises the second communication device obtaining the identification information associated with the first communication device from an entity that manufactures the first communication device.

35. The method of claim 34, wherein the second communication device obtains the identification information associated with the first communication device from the entity that manufactures the first communication device via a web based interface.

36. Apparatus for performing a security provisioning protocol between a first communication device and a second communication device over at least one wide area communication network, the apparatus at the first communication device comprising:
a memory; and
at least one processor coupled to the memory and configured to: automatically use access information stored in the memory and not previously provisioned in the wide area communication network to gain access to the wide area communication network for an initial purpose of communicating with the second communication device; and automatically perform an authenticated key exchange operation with the second communication device over the wide area communication network and establish a secure communication key as a result of the authenticated key exchange operation for subsequent use by the first communication device for secure communications;
wherein the wide area communication network is operated by a first entity and the second communication device is operated by a different second entity.

37. Apparatus for performing a security provisioning protocol between a first communication device and a second communication device over at least one wide area communication network, the apparatus at the second communication device comprising:
a memory; and
at least one processor coupled to the memory and configured to: obtain identification information associated with the first communication device; and, upon the first communication device gaining access to the wide area communication network using access information stored in the first communication device and not previously provisioned in the wide area communication network, automatically perform an authenticated key exchange operation with the first communication device over the wide area communication network and establish a secure communication key as a result of the authenticated key exchange operation for subsequent use by the first communication device for secure communications;
wherein the wide area communication network is operated by a first entity and the second communication device is operated by a different second entity.

* * * * *